United States Patent
Chou et al.

(10) Patent No.: US 11,444,301 B2
(45) Date of Patent: Sep. 13, 2022

(54) POWER SUPPLY DEVICE, FLYING TOOL USING SAME AND POWER SUPPLY METHOD THEREOF

(71) Applicant: INDUSTRIAL TECHNOLOGY RESEARCH INSTITUTE, Hsinchu (TW)

(72) Inventors: Yuh-Fwu Chou, Zhubei (TW); Ho-Cheng Lin, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 297 days.

(21) Appl. No.: 16/562,901

(22) Filed: Sep. 6, 2019

(65) Prior Publication Data

US 2020/0083550 A1  Mar. 12, 2020

Related U.S. Application Data

(60) Provisional application No. 62/727,599, filed on Sep. 6, 2018.

(51) Int. Cl.
*H01M 8/04858* (2016.01)
*H01M 16/00* (2006.01)
(Continued)

(52) U.S. Cl.
CPC ... *H01M 8/04888* (2013.01); *H01M 8/04302* (2016.02); *H01M 8/04895* (2013.01);
(Continued)

(58) Field of Classification Search
CPC ......... H01M 8/04888; H01M 8/04302; H01M 8/04895; H01M 16/006; H01M 2250/20;
(Continued)

(56) References Cited

U.S. PATENT DOCUMENTS 6,369,461 B1 * 4/2002 Jungreis .............. H01M 16/003
307/46
7,821,225 B2 10/2010 Chou et al.
(Continued)

FOREIGN PATENT DOCUMENTS

CN  1346759 A  5/2002
CN  1841824 A  10/2006
(Continued)

OTHER PUBLICATIONS

European Communication pursuant to Article 94(3) EPC for European Application No. 19195876.8, dated Sep. 13, 2021.
(Continued)

*Primary Examiner* — Ula C Ruddock
*Assistant Examiner* — Matthew W Van Oudenaren
(74) *Attorney, Agent, or Firm* — Birch, Stewart, Kolasch & Birch, LLP

(57) ABSTRACT

A power supply device disposed on an aircraft to provide a power to the aircraft is provided. The aircraft has an average required power value. The power supply device includes a secondary battery, a transformer and a fuel cell. The transformer is coupled between the secondary battery and the aircraft. The fuel cell is coupled to the aircraft and is adapted to provide a first output current to the aircraft. The transformer has an output voltage set value. When the first output end voltage of the fuel cell is lower than the output voltage set value, the transformer provides a second output current of the secondary battery to the aircraft. The output voltage set value is in a voltage range with a fuel cell output power between the maximum power value of characteristic curve of the fuel cell and the average required power value of the aircraft.

16 Claims, 8 Drawing Sheets

(51) Int. Cl.
*H01M 8/04302* (2016.01)
*B60L 3/00* (2019.01)
*B60L 50/75* (2019.01)
*B60L 58/40* (2019.01)

(52) U.S. Cl.
CPC ......... *H01M 16/006* (2013.01); *B60L 3/0046* (2013.01); *B60L 3/0053* (2013.01); *B60L 50/75* (2019.02); *B60L 58/40* (2019.02); *B60L 2200/10* (2013.01); *H01M 2250/20* (2013.01); *H02J 2300/30* (2020.01)

(58) Field of Classification Search
CPC ...... B60L 3/0046; B60L 3/0053; B60L 58/40; B60L 2200/10; B60L 50/75
See application file for complete search history.

(56) References Cited

U.S. PATENT DOCUMENTS

| | | |
|---|---|---|
| 2005/0040786 A1 | 2/2005 | Ichinose et al. |
| 2005/0112420 A1 | 5/2005 | Lai et al. |
| 2006/0029845 A1 | 2/2006 | Konoto et al. |
| 2010/0253276 A1 | 10/2010 | Hung et al. |
| 2011/0032733 A1 | 2/2011 | Watanabe et al. |
| 2011/0071706 A1* | 3/2011 | Crumm .............. B64D 27/24 701/3 |
| 2017/0310142 A1 | 10/2017 | Watanabe et al. |
| 2018/0105063 A1 | 4/2018 | Wei et al. |

FOREIGN PATENT DOCUMENTS

| | | |
|---|---|---|
| CN | 1917324 A | 2/2007 |
| CN | 1928580 A | 3/2007 |
| CN | 101123310 A | 2/2008 |
| CN | 101188298 A | 5/2008 |
| CN | 101515723 A | 8/2009 |
| CN | 101578731 A | 11/2009 |
| CN | 101606261 A | 12/2009 |
| CN | 101826627 A | 9/2010 |
| CN | 101868881 A | 10/2010 |
| CN | 102136586 A | 7/2011 |
| CN | 102379061 A | 3/2012 |
| CN | 102834959 A | 12/2012 |
| CN | 103576651 A | 2/2014 |
| CN | 103847970 A | 6/2014 |
| CN | 104471818 A | 3/2015 |
| CN | 106183855 A | 12/2016 |
| CN | 107154506 A | 9/2017 |
| CN | 108163214 A | 6/2018 |
| CN | 108206294 A | 6/2018 |
| EP | 3 210 817 A1 | 8/2017 |
| JP | 11-191424 A | 7/1999 |
| JP | 2004-508689 A | 3/2004 |
| JP | 2006-49175 A | 2/2006 |
| JP | 2006-310246 A | 11/2006 |
| JP | 2007-59332 A | 3/2007 |
| KR | 10-2013-0122558 A | 11/2013 |
| KR | 10-2018-0000639 A | 1/2018 |
| TW | I274454 A | 2/2007 |
| TW | I276240 A | 3/2007 |
| TW | 200926495 A | 6/2009 |
| TW | 201037877 A1 | 10/2010 |
| TW | I429121 A | 3/2014 |
| TW | I445240 A | 7/2014 |
| TW | 201832444 A | 9/2018 |
| WO | WO 02/21659 A1 | 3/2002 |
| WO | WO 2017/113338 A1 | 7/2017 |

OTHER PUBLICATIONS

Chinese Office Action and Search Report, dated Nov. 24, 2020, for Chinese Application No. 201910842611.3.
Japanese Office Action, dated Dec. 8, 2020, for Japanese Application No. 2019-163364, with an English machine translation.
Bassam et al., "An Improved Energy Management Strategy for a Hybrid Fuel Cell/Battery Passenger Vessel", International Journal of Hydrogen Energy, Aug. 24, 2016, pp. 1-13.
Choi et al., "Development and Demonstration of PEM Fuel-Cell-Battery Hybrid System for Propulsion of Tourist Boat", International Journal of Hydrogen Energy, vol. 41, Jan. 21, 2016, 3591-3599.
Gong et al., "Flight Test of a Fuel-Cell/Battery/Supercapacitor Triple Hybrid UAV Propulsion System", 31st Congress of the International Hybrid of the Aeronautical Sciences, Belo Horizonte, Brazil, Sep. 9-10, 2018, pp. 1-10, 11 pages total.
Han et al., "An Energy Management System of a Fuel Cell/Battery Hybrid Boat", Energies, vol. 7, 2014, pp. 2799-2820.
Wang et al., "Bi-directional DC to DC Converters for a Fuel Cell Systems", Institute of Electrical and Electronics Engineers, 1998, 5 pages total.
Wilhelm et al., "Energy Management for a Fuel Cell/Battery Hybrid System", Institute of Electrical and Electronics Engineers, 2010, 6 pages total.
Extended European Search Report dated Feb. 7, 2020, for European Application No. 19195876.8.
Kim et al., "Design and development of a fuel cell-powered small unmanned aircraft", International Journal of Hydrogen Energy, vol. 37, 2012, pp. 615-622.
Lee et al., "Active power management system for an unmanned aerial vehicle powered by solar cells, a fuel cell, and batteries", IEEE Transactions on Aerospace and Electronic Systems, IEEE Service Center, Piscataway, NJ, vol. 50, No. 4, Oct. 1, 2014, pp. 3167-3177.
Mobariz et al. "Long endurance hybrid fuel cell-battery powered UAV", World Journal of Modelling and Simulation, vol. 11, No. 1, 2015, pp. 69-80.
Strele, "Power Management for Fuel Cell and Battery Hybrid Unmanned Aerial Vehicle Applications", Ann Arbor, Dec. 1, 2016, http://repository.asu.edu/attachments/176475/content/Strele_asu_0010N_16473.pdf, 210 pages total.
Chinese Office Action and Search Report for Chinese Application No. 201910842611.3, dated Jun. 23, 2021.

* cited by examiner

POWER SUPPLY DEVICE, FLYING TOOL USING SAME AND POWER SUPPLY METHOD THEREOF

This application claims the benefit of U.S. provisional application Ser. No. 62/727,599, filed Sep. 6, 2018, the subject matter of which is incorporated herein by reference.

BACKGROUND OF THE DISCLOSURE

Field of the Disclosure

The disclosure relates in general to a power supply device, a flying tool using the same and a power supply method thereof.

Description of the Related Art

The power requirement of an ordinary flying tool (such as multi-rotor drone) during the flight time is normally provided by a rechargeable battery. However, the rechargeable battery (such as a lithium polymer battery), under the constraint of limited space and weight, can only support the flying tool to fly for less than an hour. In recent years, the developers aim to dispose a fuel cell on the flying tool. The fuel cell can transform hydrogen into a large amount of energy which suffices to support the flying tool to fly for a longer time. Such design has the following advantages: the hydrogen fuel used in the fuel cell possesses high energy density (generated energy per unit weight, such as Wh/kg), and the generated power can meet the power requirement of a longer flight time, such that the flying tool can extend its flight distance.

However, since the fuel cell has a low power density (generated power per unit weight, such as W/kg), a large amount of fuel cells are needed to provide extra power to resist the instant changes in the flight environment (for example, the sudden attack of the gust). The increase in fuel cells has negative effects on the flying tool: the weight is increased and the flight time is reduced.

Therefore, how to provide an efficient power supply method to increase the flight time or length of the flying tool has become a prominent task for the industries.

SUMMARY OF THE DISCLOSURE

The disclosure is directed to a power supply device, a flying tool using the same and a power supply method thereof.

According to an embodiment of the present disclosure, a power supply device is provided. The power supply device is disposed on an aircraft to provide a power to the aircraft. The aircraft has an average required power value. The power supply device includes a secondary battery, a first transformer and a fuel cell. The first transformer is coupled between the secondary battery and the aircraft. The fuel cell is coupled to the aircraft and is adapted to provide a first output current to the aircraft. The first transformer has an output voltage set value. When the first output end voltage of the fuel cell is lower than the output voltage set value, the first transformer provides a second output current of the secondary battery to the aircraft. The output voltage set value is in a voltage range with a fuel cell output power between the maximum power value of characteristic curve of the fuel cell and the average required power value of the aircraft.

According to another embodiment of the present disclosure, a flying tool is provided. The flying tool includes an aircraft and a power supply device. The power supply device is disposed on the aircraft to provide a power to the aircraft. The aircraft has an average required power value. The power supply device includes a secondary battery, a first transformer and a fuel cell. The first transformer is coupled between the secondary battery and the aircraft. The fuel cell is coupled to the aircraft and is adapted to provide a first output current to the aircraft. The first transformer has an output voltage set value. When the first output end voltage of the fuel cell is lower than the output voltage set value, the first transformer provides a second output current of the secondary battery to the aircraft. The output voltage set value is in a voltage range with a fuel cell output power between the maximum power value of characteristic curve of the fuel cell and the average required power value of the aircraft.

According to an alternate embodiment of the present disclosure, a power supply method of a power supply device is provided. The power supply device is disposed on an aircraft. The power supply device includes a secondary battery, a first transformer and a fuel cell. The secondary battery is coupled to the aircraft through the first transformer having an output voltage set value. The power supply method includes the following steps. A first output current is provided to the aircraft by the fuel cell. A second output current of the secondary battery is provided to the aircraft by the first transformer when the first output end voltage of the fuel cell is lower than the output voltage set value. The output voltage set value ranges between the maximum power value of characteristic curve of the fuel cell and the average required power value of the aircraft.

The above and other aspects of the disclosure will become better understood with regards to the following detailed description of the preferred but non-limiting embodiment (s). The following description is made with reference to the accompanying drawings.

DETAILED DESCRIPTION OF THE DISCLOSURE

For the objects, structures, technical features and functions of the present disclosure to be more easily understood by anyone ordinary skilled in the technology field, a number of exemplary embodiments are disclosed below with detailed descriptions and accompanying drawings.

Figure 1A:
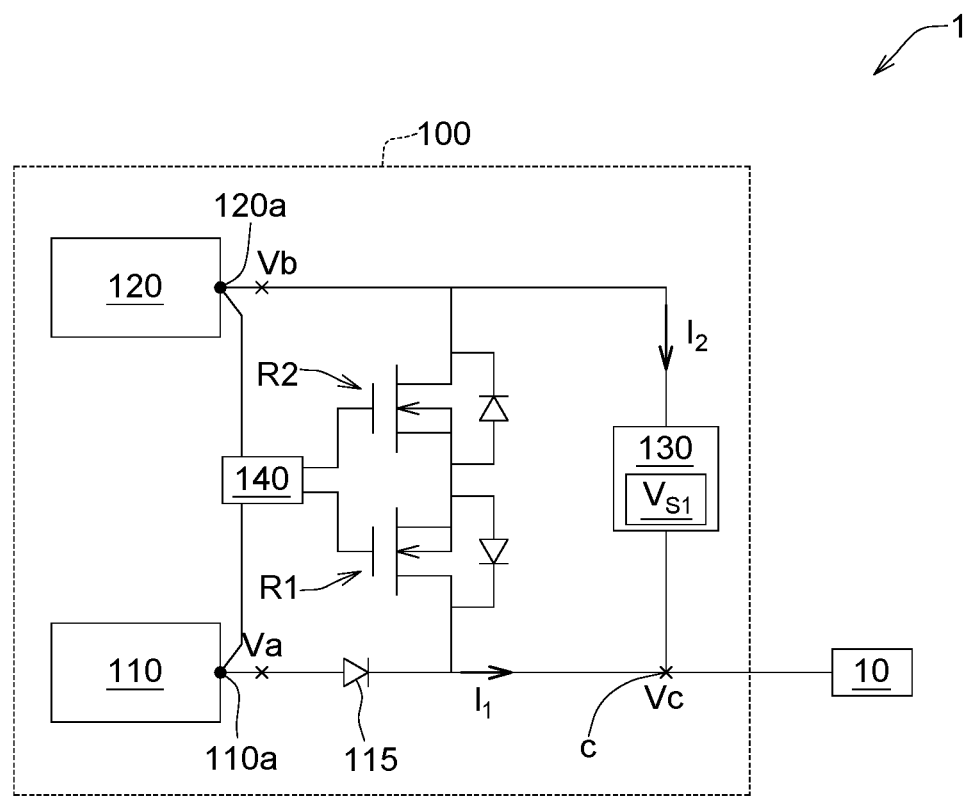
FIG. 1A is a functional block diagram of a flying tool according to an embodiment of the present disclosure.

Refer to FIG. 1A to 10. FIG. 1A is a functional block diagram of a flying tool 1 according to an embodiment of the present disclosure. FIG. 1B is a relationship chart of flight time vs power requirement of the flying tool 1 of FIG. 1A. FIG. 10 is a characteristic curve chart of the fuel cell 100 of FIG. 1A. The flying tool 1 includes a power supply device 100 and an aircraft 10. The power supply device 100 is disposed on the aircraft 10 to provide a power to the aircraft 10. The aircraft 10 can be realized by a drone, a transportation for cargo or a transportation for passengers.

As indicated in FIG. 1A, the power supply device 100 includes a fuel cell 110, a diode 115, a secondary battery 120, a first transformer 130, a controller 140, a first switch R1 and a second switch R2. The first transformer 130 is coupled to the secondary battery 120 and the aircraft 10. The fuel cell 110 is coupled to the aircraft 10 to provide a first output current $I_1$ to the aircraft 10. The aircraft 10 has an average required power value $P_{av}$. The average required power value $P_{av}$ is set according to the flight mode of the aircraft 10, and is not subjected to specific restrictions in the embodiments of the present disclosure. The first transformer 130 has an output voltage set value $V_{S1}$. When the first output end voltage Va at the output end 110a of the fuel cell 110 is lower than the output voltage set value $V_{S1}$, the first transformer 130 provides a second output current $I_2$ of the secondary battery 120 to the aircraft 10.

As indicated in FIG. 1A, the first switch R1 and the second switch R2 are electrically coupled between (such as connected in parallel with) the output end 120a of the secondary battery 120 and the output end 110a of the fuel cell 110. The controller 140 can control the fuel cell 110 to or not to charge the secondary battery 120 by concurrently turning on/off the first switch R1 and the second switch R2. The controller 140 is electrically coupled to the output end 110a of the fuel cell 110 and the output end 120a of the secondary battery 120 to detect the first output end voltage Va and the second output end voltage Vb. The controller 140 can determine the magnitude of the first output end voltage Va of the fuel cell 110 and that of the second output end voltage Vb of the secondary battery 120. When the first output end voltage Va of the fuel cell 110 is equivalent to or higher than the second output end voltage Vb at the output end 120a of the secondary battery 120, the controller 140 concurrently turns on/off the first switch R1 and the second switch R2 and cause the fuel cell 110 to charge the secondary battery 120. When the first output end voltage Va of the fuel cell 110 is lower than the second output end voltage Vb of the secondary battery 12, the controller 140 concurrently turns off the first switch R1 and the second switch R2 and cause the fuel cell 110 not to charge the secondary battery 120.

Besides, the diode 115 is coupled between the fuel cell 110 and the first transformer 130 and is capable of preventing the current of the secondary battery 120 from flowing to the fuel cell 110.

Figure 2A:
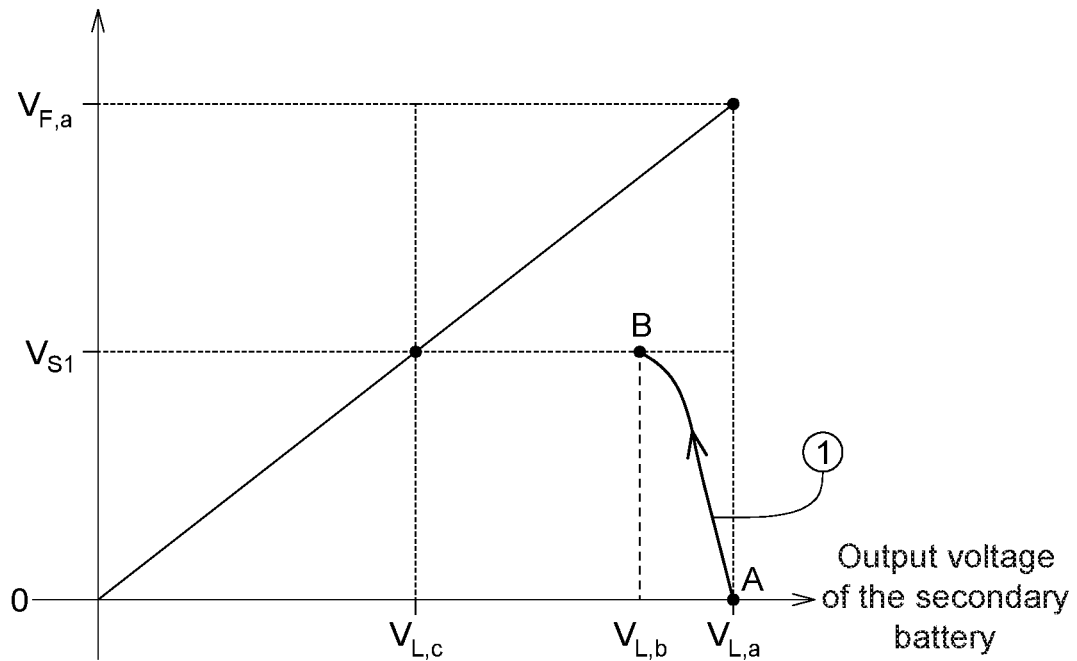
FIGS. 2A to 2F are schematic diagrams of power supply mode of the power supply device during the flight of the aircraft of FIG. 1A.

The operating (working) voltage of the fuel cell 110 ranges between the output voltage set value $V_{S1}$ (that is, the operating voltage lower limit) and the operating voltage upper limit $V_{F,a}$ (illustrated in FIG. 2A). In an embodiment, the fuel cell 110 can be formed of several fuel cell units (such as proton exchange membranes) connected in series, wherein the operating voltage of each fuel cell unit ranges between 0.608V and 0.692V. The fuel cell 110 is formed of 72 fuel cell units connected in series. The fuel cell 110 can provide an operating voltage ranging between 43.8V (such as the output voltage set value $V_{S1}$) and 49.8V (such as the operating voltage upper limit $V_{F,a}$).

The secondary battery 120 can be realized by a lithium battery. The operating voltage of the secondary battery 120 ranges between the operating voltage lower limit $V_{L,c}$ (illustrated in FIG. 2A) and the operating voltage upper limit $V_{L,a}$ (illustrated in FIG. 2A). In an embodiment, the secondary battery 120 can be realized by several secondary battery units (such as lithium nickel manganese cobalt (NMC) batteries), wherein the operating voltage of each secondary battery unit ranges between 3.65V and 4.15V. The secondary battery 120 is formed of 12 secondary battery units connected in series. The secondary battery 120 can provide an operating voltage ranging between 43.8V (such as the operating voltage lower limit $V_{L,c}$) and 49.8V (such as the operating voltage upper limit $V_{L,a}$).

In an embodiment, the operating voltage upper limit $V_{L,a}$ of the secondary battery 120 is substantially equivalent to the operating voltage upper limit $V_{F,a}$ of the fuel cell 110, and the operating voltage lower limit $V_{L,c}$ of the secondary battery 120 is substantially equivalent to the output voltage set value $V_{S1}$ of the fuel cell 110 (such as the operating voltage lower limit). In another embodiment, the operating voltage upper limit $V_{L,a}$ of the secondary battery 120 is different from the operating voltage upper limit $V_{F,a}$ of the fuel cell 110, and the operating voltage lower limit $V_{L,c}$ of the secondary battery 120 is different from the output voltage set value $V_{S1}$ of the fuel cell 110.

The first transformer 130 can detect the node voltage Vc at the node c located on the connection line between the fuel cell 110 and the aircraft 10. Since the voltage loss between the output end 110a of the fuel cell 110 and the node c can be omitted, the node voltage Vc detected by the first transformer 130 is substantially equivalent to the first output end voltage Va at the output end 110a of the fuel cell 110. In other words, when the node voltage Vc detected by the first transformer 130 is lower than the output voltage set value $V_{S1}$ (that is, when the first output end voltage Va of the fuel cell 110 is lower than the output voltage set value $V_{S1}$), the first transformer 130 provides the second output current $I_2$ of the secondary battery 120 to the aircraft 10. Besides, the first transformer 130 can be realized by a step-down (Buck) converter. Thus, when the second output end voltage Vb of the secondary battery 120 is higher than the output voltage set value $V_{S1}$, the first transformer 130 step-down the second output end voltage Vb of the secondary battery 120 to the output voltage set value $V_{S1}$. In an embodiment, the first transformer 130 can be realized by a direct current to direct current (DC/DC) transformer.

Generally speaking, the efficiency of the first transformer 130 is lower than 100%. Therefore, the second output current $I_2$ will inevitable experience energy loss after flowing through the first transformer 130. The secondary battery 120 provides the second output current $I_2$ to the aircraft 10 through the first transformer 130 only when the first output end voltage Va of the fuel cell 110 is lower than the output voltage set value $V_{S1}$. Since the first output end voltage Va of the fuel cell 110 is not lower than the output voltage set value $V_{S1}$, the secondary battery 120 does not provide the current to the aircraft 10. Thus, the energy loss which occurs when the current flows through the first transformer 130 is reduced, and the power consumption of the secondary battery 120 is also reduced.

Figure 1B:
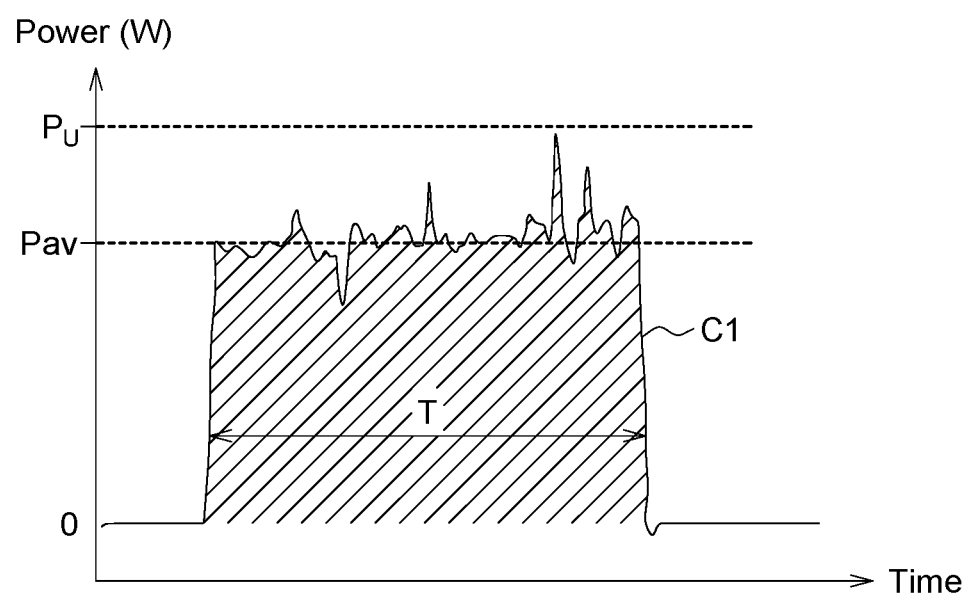
FIG. 1B is a relationship chart of flight time vs power requirement of the flying tool of FIG. 1A.
Figure 1C:
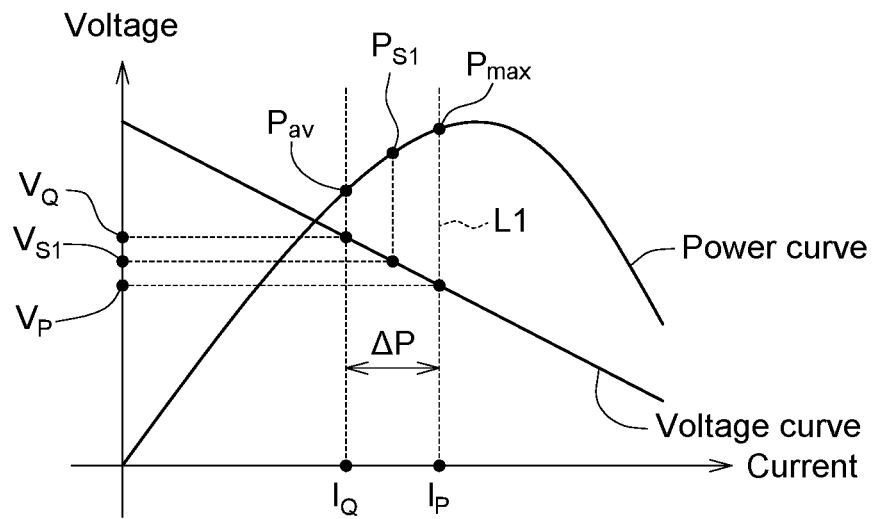
FIG. 1C is a characteristic curve chart of the fuel cell of FIG. 1A.

As indicated in FIG. 1B, the curve C1 denotes the relationship between the operation period (for example, when the aircraft is taking off, flying and landing) and the power of the aircraft 10, wherein $P_{av}$ denotes the average required power value, and $P_U$ denotes the largest required power value. Within the operation period T of the aircraft 10, the average required power value $P_{av}$ is provided by the fuel cell 110, and the instant power requirement between the average required power value $P_{av}$ and the largest required power value $P_U$ is provided by the secondary battery 120. In other words, the secondary battery 120 makes up the power deficiency of the instant power requirement of the aircraft 10 (for example, when the aircraft is making a turn or is resisting a gust). In terms of the power (work/unit time) indicated in the curve C1, the power provided by the fuel cell 110 amounts to about 70% of the total power provided by the power supply device 100, and the power provided by the secondary battery 120 amounts to about 30% of the total power provided by the power supply device 100. In an embodiment, the operation period T of the aircraft 10 is 500 seconds, and the total power provided by the power supply device 100 during the operation time is about 2300 watts (W). The power provided by the fuel cell 110 is about 1600 W, and the power provided by the secondary battery 120 is about 700 W.

In the preset embodiment, in terms of energy (that is, the integral area under the curve C1), the energy provided by the fuel cell 110 amounts to about 93.75% of the total energy provided by the power supply device 100, and the power provided by the secondary battery 120 amounts to about 6.25% of the total power provided by the power supply device 100. In an embodiment, the total power during the operation time of the aircraft 10 is about 320 Wh, wherein the power provided by the fuel cell 110 is about 300 Wh, and the power provided by the secondary battery 120 is about 20 Wh. Suppose the efficiency of the first transformer 130 is 95%. The power provided by the secondary battery 120 drops to 19 Wh (20 Wh×0.95) after flowing through the first transformer 130. Since the power provided by the fuel cell 110 does not flow through the first transformer 130, no energy loss will occur (the efficiency is 100%), and the power provided to the aircraft 10 by the fuel cell 110 can substantially be viewed as 300 Wh. Thus, in terms of the power supply device 100, the overall efficiency of energy transmission can reach as high as 99.7% (formula: (300× 100%+20×95%)/320=99.7%).

As disclosed above, the secondary battery 120 provides the second output current $I_2$ to the aircraft 10 only when the first output end voltage Va of the fuel cell 110 is equivalent to or lower than the output voltage set value $V_{S1}$; meanwhile, the fuel cell 110 provides the first output current $I_1$ to the aircraft 10. Since the first output end voltage Va of the fuel cell 110 is not lower than the output voltage set value $V_{S1}$, the secondary battery 120 does not provide the current to the aircraft 10 (the energy loss which would otherwise occurs when the current flows through the first transformer 130 will not occur), and the overall efficiency of energy transmission of the power supply device 100 is increased.

The power supply device of the present embodiment is adapted to the situation when the base load ratio is high. For example, when the base load ratio is higher than 50%, the fuel cell 110 has the advantage of high energy density, and therefore can be used as the main power supplier to provide power supply for the base load. Since the fuel cell 110 cannot instantly increase power supply, the secondary battery 120 having high power density is used to provide extra power supply when the requirement of power supply for the load instantly increases.

The determination of the output voltage set value $V_{S1}$ is disclosed below.

FIG. 10 is a characteristic curve chart of the fuel cell 110 which includes a voltage curve (illustrating the current vs voltage relationship) and a power curve. As indicated in FIG. 10, the output voltage set value $V_{S1}$ is a point at the voltage curve of the characteristic curve chart. The output voltage set value $V_{S1}$ is a voltage value corresponding to the range ΔP between the maximum power value $P_{max}$ of characteristic curve of the fuel cell 110 and the average required power value $P_{av}$ of the aircraft 10. Suppose the output power $P_{S1}$ of the fuel cell 110 is greater than the average required power value $P_{av}$ of the aircraft 10. If the power requirement of the aircraft 10 at a particular time point during the flight is lower than the average required power value $P_{av}$, then the fuel cell 110, apart from meeting the flight power requirement, will have extra power to charge the secondary battery 120 to replenish the power consumed when the power requirement of the aircraft 10 is greater than the output power $P_{S1}$ of the fuel cell 110. Then, in the following flight time, the secondary battery 120 will have sufficient capacity to make up the power deficiency of the fuel cell 110 when the instant power requirement of the aircraft 10 is again greater than the output power $P_{S1}$ of the fuel cell 110.

As indicated in FIG. 10, the vertical line L1 passes through the maximum power value $P_{max}$. The fuel cell correspondingly outputs a voltage VP and an output current $I_P$. As the output voltage set value $V_{S1}$ moves rightward and gets closer to the vertical line L1, the energy loss of the fuel cell 110 increases and the efficiency of the fuel cell 110 decreases. At the average required power value $P_{av}$, the fuel cell 110 outputs a voltage $V_Q$ and a current $I_Q$, wherein the output voltage set value $V_{S1}$ ranges between the voltage $V_P$ and the voltage $V_Q$. As the output voltage set value $V_{S1}$ moves leftwards and gets away from the vertical line L1, the fuel cell 110 outputs a larger voltage and has a higher efficiency, but the output current decreases and the output power $P_{S1}$ also decreases. Due to the above feature, the fuel cell 110 will have less capacity to charge the secondary battery 120 after providing required power to the aircraft 10. Therefore, after providing required power to the aircraft 10, the secondary battery 120 needs a longer duration to restore its capacity to the safety level. In response to the change in the flight environment and situations, the secondary battery 120 must have a sufficient allowance to meet the continuous power requirement of the aircraft 10 (for example, when the aircraft 10 is continuously climbing or accelerating). The smaller the output power $P_{S1}$ of the fuel cell 110, the slower the buildup of the SOC. If the secondary battery 120 is large, the fuel cell 110 will have more time to restore the SOC of the secondary battery 120 to the expected safety level.

Referring to FIGS. 2A to 2F, schematic diagrams of power supply mode of the power supply device during the flight of the aircraft 10 of FIG. 1A are shown. The horizontal axis denotes the voltage state of the secondary battery 120, and the vertical axis denotes the voltage state of the fuel cell 110. The change in the first output end voltage Va of the fuel cell 110 is denoted with a bold dotted line, and the change in the second output end voltage Vb of the secondary battery 120 is denoted with a bold solid line.

As indicated in FIG. 2A, before the aircraft 10 takes off, the first output end voltage Va of the fuel cell 110 is at point A and is in an initial state, and the second output end voltage Vb of the secondary battery 120 is at point A and is in an initial state. In the initial state, since the fuel cell 110 has not yet been activated, the first output end voltage Va of the fuel cell 110a is 0. As indicated in FIG. 2A, in the initial state, the initial voltage of the secondary battery 120 is $V_{L,a}$, which is the voltage of full capacity or more than 90% of full capacity of the secondary battery 120.

Refer to FIG. 2A. During the start-up stage ①, the aircraft 10 starts to operate, and the secondary battery 120 provides a second output current $I_2$ to meet the power requirement (the load) of the aircraft 10 at the initial stage of operation of the aircraft 10 (for example, when the aircraft 10 starts to rotate its blades). By doing so, the second output end voltage Vb of the secondary battery 120 will drop (the state of charge (SOC) will drop), for example, drop to the voltage $V_{L,b}$ at the state point B from the voltage $V_{L,a}$ at the state point A. During the start-up stage ①, the fuel cell 120 starts to operate, and the first output end voltage Va continue to increase, for example, to the voltage $V_{S1}$ at the state point B from the initial voltage at the state point A (nearly 0). However, since the first output end voltage Va of the fuel cell 110 (the voltage at the initial stage of operation) is lower than the node voltage Vc (the output voltage) of the first transformer 130, the diode 115 is in a reverse bias state, and the first output current $I_1$ still cannot flow through the diode 115 (and therefore cannot be provided to the aircraft 10). In other words, in the start-up stage ①, the power requirement of the aircraft 10 can only be provided by the secondary battery 120.

Figure 2B:
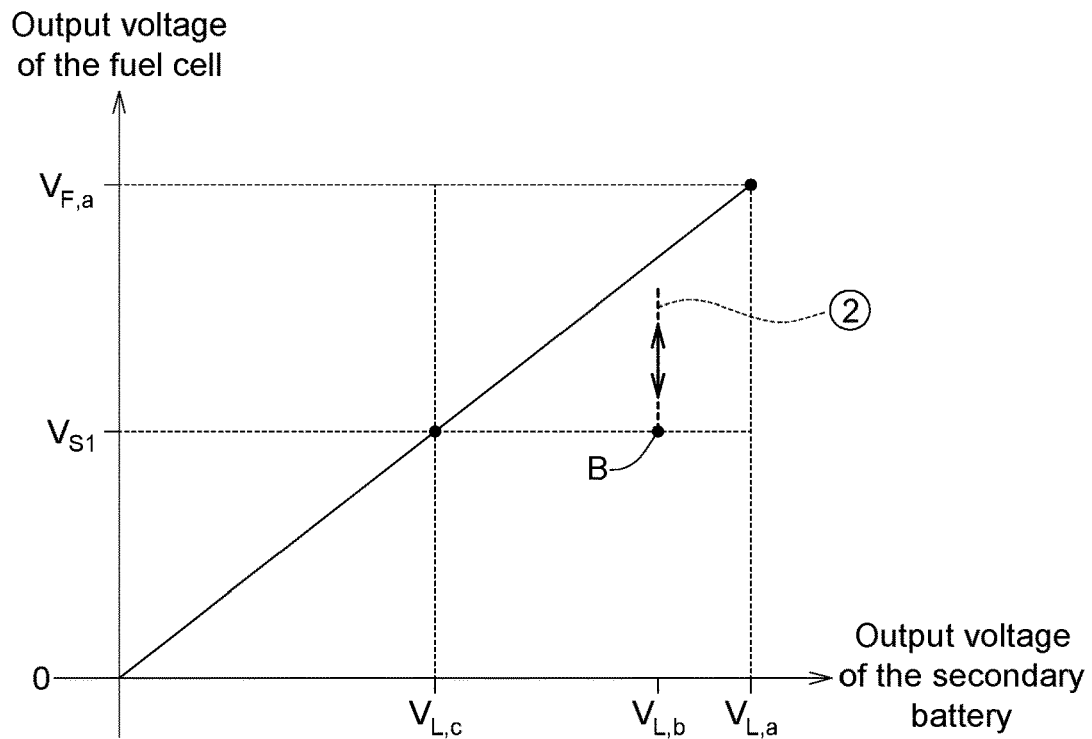

Refer to FIG. 2B. During the no power supply provided by the secondary battery stage ②, when the first output end voltage Va of the fuel cell 110 continue to rise until it exceeds the output voltage set value $V_{S1}$ (corresponding to the state point B), the first transformer 130 stops providing the second output current $I_2$ to the aircraft 10 and causes the secondary battery 120 to stop outputting current to the aircraft 10, such that current loss which would otherwise occur when the current flows through the first transformer 130 can be avoided. During the no power supply provided by the secondary battery stage ②, the second output end voltage Vb of the secondary battery 120 can remain the level of the voltage $V_{L,b}$ at the state point B, and the first output end voltage Va of the fuel cell 110 can change according to the change in the level of the power requirement of the aircraft 10 as indicated in the upward or downward arrow illustrated in the no power supply provided by the secondary battery stage ②.

Refer to the upward arrow of the no power supply provided by the secondary battery stage ② as indicated in FIG. 2B. Since the power requirement of the aircraft 10 is not a large amount (for example, when the aircraft 10 is warming up), the power generated by the fuel cell 110, apart from meeting the power requirement of the aircraft 10, can further cause the first output end voltage Va to rise. Refer to the downward arrow of the no power supply provided by the secondary battery stage ② as indicated in FIG. 2B. When the power requirement of the aircraft 10 increases (for example, when the aircraft 10 is ready to take off and the rotation of the blades accelerates), the first output current $I_1$ provided to the aircraft 10 by the fuel cell 110 increases and causes the first output end voltage Va of the fuel cell 110 to drop.

Figure 2C:
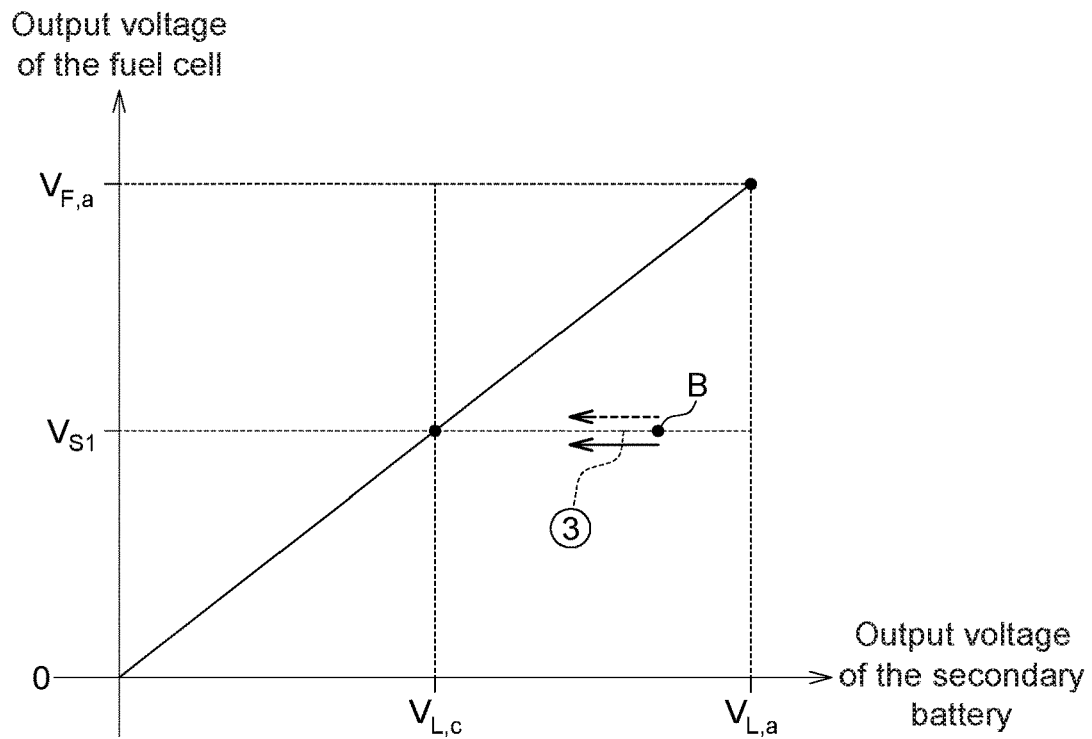

Refer to the auxiliary power supply provided by the secondary battery stage ③ as indicated in FIG. 2C. Since the power requirement of the aircraft 10 increases (for example, when the aircraft needs a large amount of instant power to make a turn or resist a gust), the first output end voltage Va of the fuel cell 110 drops to the output voltage set value $V_{S1}$. Meanwhile, the power provided by the fuel cell 110 is insufficient for the aircraft 10, therefore the second output current $I_2$ generated by the secondary battery 120 is provided to the aircraft 10 through the first transformer 130 to make up the power deficiency of the fuel cell 110. During the auxiliary power supply provided by the secondary battery stage ③, the fuel cell 110 and the secondary battery 120 concurrently provide the required power to the aircraft 10.

Figure 2D:
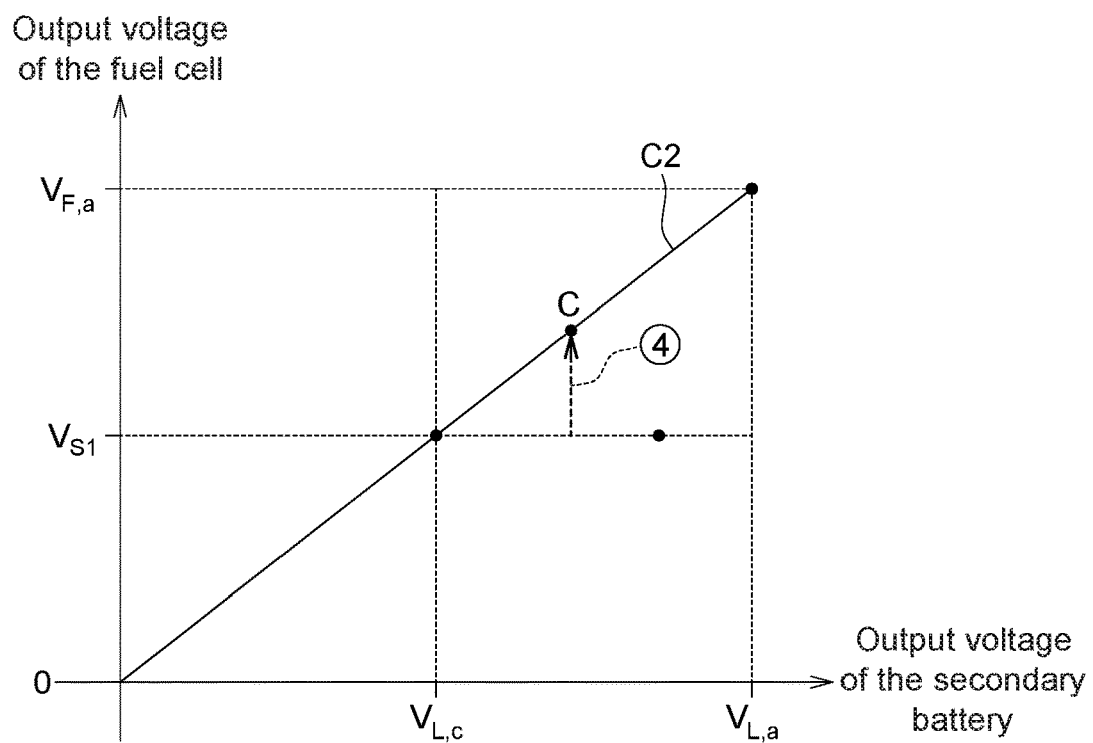

Refer to the no power supply provided by the secondary battery stage ④ as indicated in FIG. 2D. After the power requirement of the aircraft 10 drops to the basic power usage (for example, when the aircraft 10 hovers stably in the air) following a rise, the first output current $I_1$ provided to the aircraft 10 by the fuel cell 110 decreases and causes the first output end voltage Va to rise as indicated in the upward arrow of FIG. 2D. When the first output end voltage Va of the fuel cell 110 rises to the same level as that of the second output end voltage Vb of the secondary battery 120 (that is, the state point C), the fuel cell 110 starts to charge the secondary battery 120 as indicated in the charging stage ⑤ of FIG. 2E. As indicated in FIG. 2D, the curve C2 denotes that the first output end voltage Va of the fuel cell 110 is the same as the second output end voltage Vb of the secondary battery 120, and the state point C is on the curve C2.

In an embodiment, the step for charging the secondary battery 120 can be determined by the controller 140. For example, the controller 140 (illustrated in FIG. 1A) is configured to: (1) determine whether the first output end voltage Va of the fuel cell 110 is equivalent to or higher than the second output end voltage Vb of the secondary battery 120; (2) if yes, control the first switch R1 and the second switch R2 to be concurrently conductive and cause the fuel cell 110 to charge the secondary battery 120.

Figure 2E:
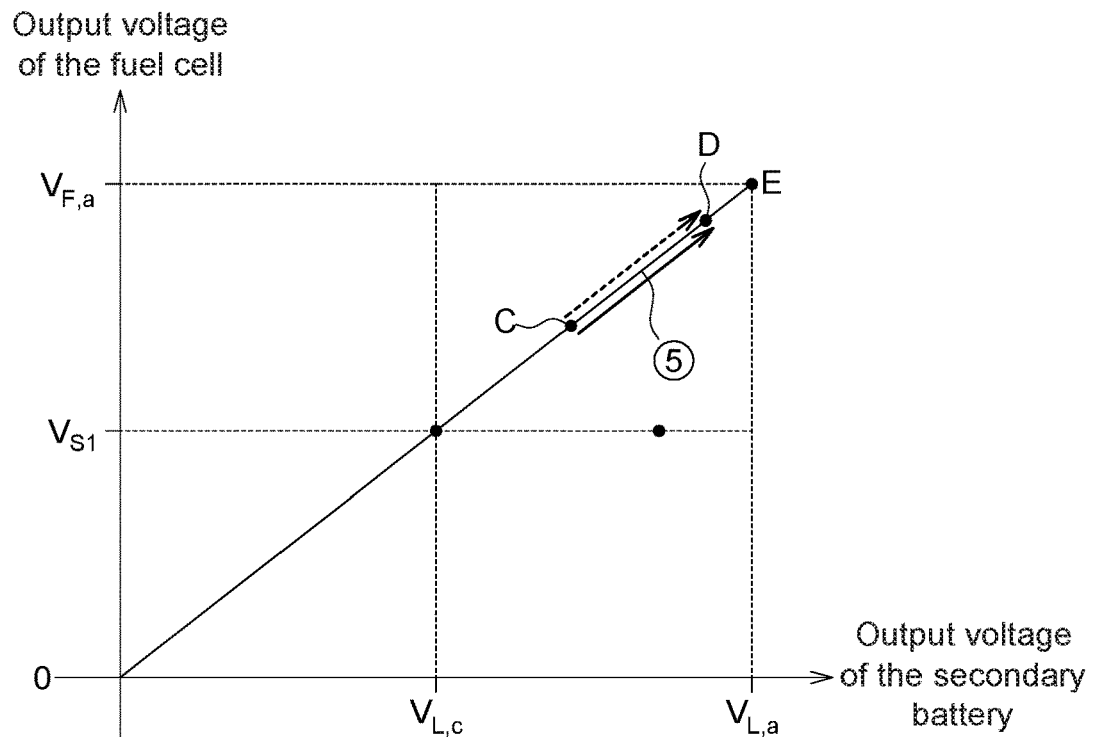

Refer to FIG. 2E. During the charging stage ⑤, since the power requirement of the aircraft 10 is low (for example, when the aircraft 10 hovers stably in the air), the first output end voltage Va of the fuel cell 110 and the second output end voltage Vb of the secondary battery 120 continues to rise until the SOC of the secondary battery 120 is full, such as reaches the state point E. Meanwhile, the fuel cell 110 stops charging the secondary battery 120. Or, when the second output end voltage Vb of the secondary battery 120 reaches the state point D, if the power requirement of the aircraft 10 instantly rises (for example, when the aircraft needs a large amount of instant power to make a turn or resist a gust), the fuel cell 110 needs to increase the current provided to the aircraft 10 and cause the first output end voltage Va of the fuel cell 110 to drop as indicated in the downward arrow of the no power supply provided by the secondary battery stage ⑥ of FIG. 2F. In the no power supply provided by the secondary battery stage ⑥, the fuel cell 110 stops charging the secondary battery 120 to provide more current to the aircraft 10.

In an embodiment, the step of stopping charging the secondary battery 120 can be completed by the controller 140. For example, the controller 140 (illustrated in FIG. 1A) is configured to: (1) determine whether the current direction of the second switch R2 moves towards Va from Vb (the discharging direction of the secondary battery); (2) if yes, control the first switch R1 and the second switch R2 to be concurrently non-conductive to stop charging the secondary battery 120.

Figure 2F:
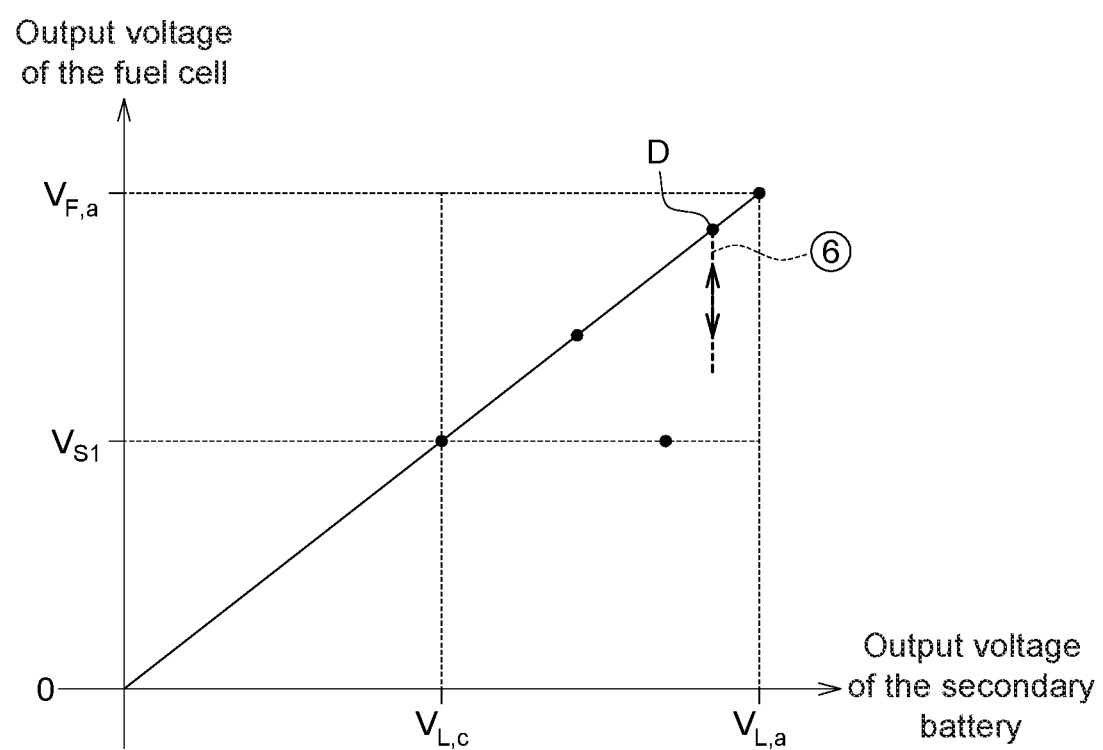

Refer to the upward arrow of the no power supply provided by the secondary battery stage ⑥ as indicated in FIG. 2F. When the power requirement of the aircraft 10 decreases again (for example, when the aircraft 10 stably hovers in the air again or is landing), the current provided to the aircraft 10 by the fuel cell 110 decreases and causes the first output end voltage Va of the fuel cell 110 to rise.

As disclosed above, when the first output end voltage Va of the fuel cell 110 is substantially equivalent to or higher than the output voltage set value $V_{S1}$, the secondary battery 120 does not provide the current to the aircraft 10 to avoid the power of the secondary battery 120 being consumed and reduce the energy loss which would other occur when the current flows through the first transformer 130. The secondary battery 120 provides power to the aircraft 10 only when the output power of the fuel cell 110 cannot match the power requirement of the aircraft 10. For example, when the first output end voltage Va of the fuel cell 110 is lower than the output voltage set value $V_{S1}$, the secondary battery 120 provides the second output current $I_2$ to the aircraft 10 to replenish the power of the aircraft 10. The first output end voltage Va of the fuel cell 110 also varies with the power requirement of the aircraft 10. When the first output end voltage Va of the fuel cell 110 rises to be substantially equivalent to the second output end voltage Vb of the secondary battery 120, the fuel cell 110 charges the secondary battery 120 until the SOC of the secondary battery 120 reaches a pre-set capacity (for example, more than 90% of the full capacity of the secondary battery 120, but the preset embodiment is not limited thereto). Or, the fuel cell 110 stops charging the secondary battery 120 when the power requirement of the aircraft 10 instantly increases and causes the first output end voltage Va of the fuel cell 110 to drop.

Figure 3A:
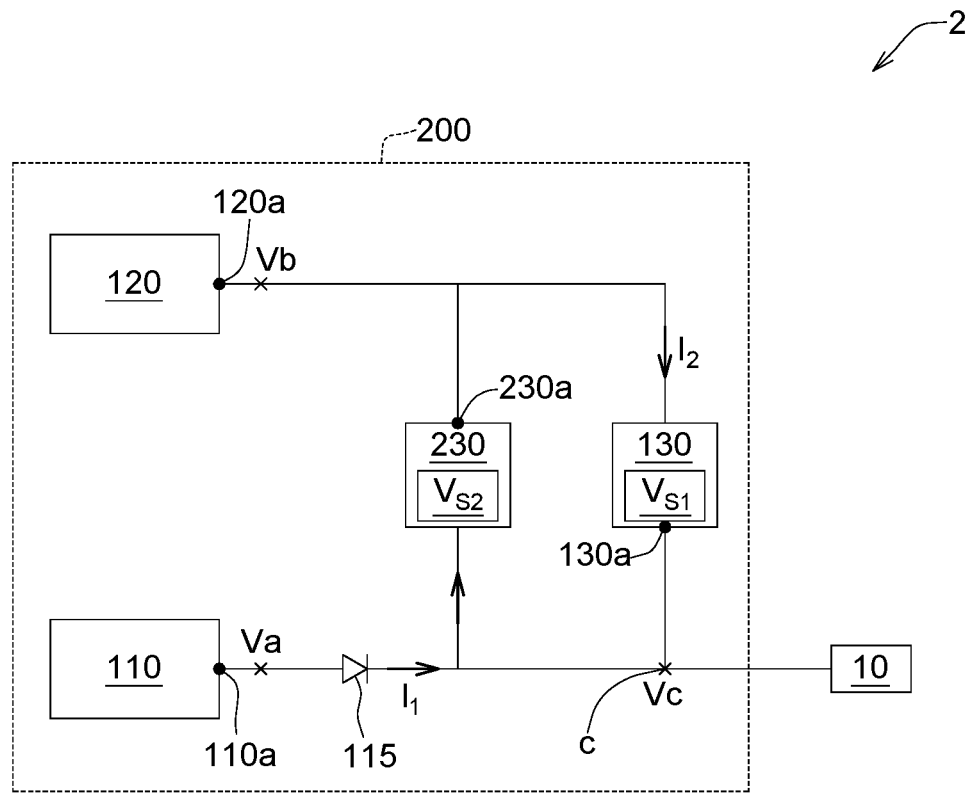
FIG. 3A is a schematic diagram of a flying tool according to another embodiment of the present disclosure.
Figure 3B:
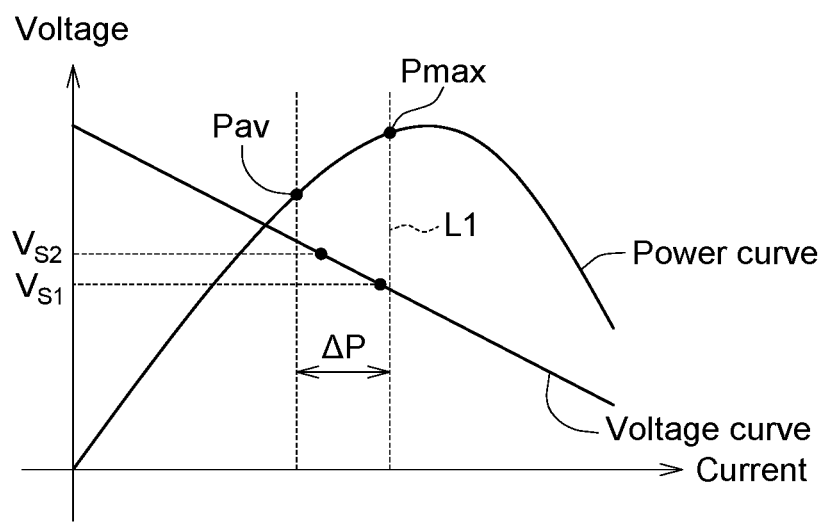
FIG. 3B is a characteristic curve chart of the fuel cell of FIG. 3.

Refer to FIGS. 3A and 3B. FIG. 3A is a schematic diagram of a flying tool 2 according to another embodiment of the present disclosure. FIG. 3B is a characteristic curve chart of the fuel cell 110 of FIG. 3A. The flying tool 2 includes a power supply device 200 and the aircraft 10. The power supply device 200 is disposed on the aircraft 10 to provide a power to the aircraft 10.

As indicated in FIG. 3A, the power supply device 200 includes a fuel cell 110, a diode 115, a secondary battery 120, a first transformer 130 and a second transformer 230. The first transformer 130 is coupled between the aircraft 10 and the output end 120a of the secondary battery 120. The second transformer 230 is coupled between the output end 110a of the fuel cell 110 and the output end 120a of the secondary battery 120. The aircraft 10 is coupled to the output end 110a of the fuel cell 110 and the output end 130a of the first transformer 130 to receive power supply from the fuel cell 110 and the first transformer 130.

In the preset embodiment, the second transformer 230 has an input voltage set value $V_{S2}$. When the first output end voltage Va of the fuel cell 110 is lower than the output voltage set value $V_{S1}$ of the first transformer 130, the second output current $I_2$ of the secondary battery 120 provides power to the aircraft 10 through the first transformer 130. When the first output end voltage Va of the fuel cell 110 is equivalent to or higher than the input voltage set value $V_{S2}$ of the second transformer 230, the fuel cell 110 charges the secondary battery 120. In an embodiment, the input voltage set value $V_{S2}$ is higher than the output voltage set value $V_{S1}$.

In the preset embodiment, the operating voltage of the secondary battery 120 is higher than the operating voltage of the fuel cell 110. Therefore, the second transformer 230 can be realized by a booster, which boosts the first output end voltage Va of the fuel cell 110 to charge the secondary battery 120. The first transformer 130 can be realized by a step-down (Buck) converter, which steps-down the second output end voltage Vb of the secondary battery 120 to match the output voltage set value $V_{S1}$ of the first transformer 130. In an embodiment, the second transformer 230 can be realized by a direct current to direct current (DC/DC) transformer.

In the preset embodiment, the output voltage set value $V_{S1}$ of the fuel cell 110 (that is, the operating voltage lower limit) is substantially equivalent to or lower than the operating voltage lower limit of the secondary battery 120, and the operating voltage of the secondary battery 120 upper limit is higher than the operating voltage upper limit of the fuel cell 110. For example, the fuel cell 110 can be formed by several fuel cell units connected in series, wherein the operating voltage of each fuel cell unit ranges between 0.625V and 0.65V. Let the fuel cell 110 be formed of 72 fuel cell units connected in series. The fuel cell 110 can provide an operating voltage ranging between 45V (the output voltage set value $V_{S1}$) and 46.8V (the operating voltage upper limit). The secondary battery 120 can be formed by several secondary battery units connected in series, wherein the operating voltage of each secondary battery unit ranges between 3.2V and 4.15V. Let the secondary battery 120 be formed of 14 secondary battery units connected in series. The secondary battery 120 can provide an operating voltage ranging between 44.8V (the operating voltage lower limit) and 58.1V (such as the operating voltage upper limit).

In the preset embodiment, the determination of the output voltage set value $V_{S1}$ of the first transformer 130 is similar to that of the output voltage set value $V_{S1}$ disclosed in above embodiment, and the similarities are not repeated here. The determination of the input voltage set value $V_{S2}$ of the second transformer 230 is disclosed below.

As indicated in FIG. 3B, the input voltage set value $V_{S2}$ is a point at the voltage curve of the characteristic curve chart. The input voltage set value $V_{S2}$ is a voltage value corresponding to the range $\Delta P$ between the maximum power value $P_{max}$ of the fuel cell 110 of characteristic curve and the average required power value $P_{av}$ of the aircraft 10, and the input voltage set value $V_{S2}$ is greater than the output voltage set value $V_{S1}$. When the first output end voltage Va of the fuel cell 110 ranges between the output voltage set value $V_{S1}$ and the input voltage set value $V_{S2}$, the power requirement of the aircraft 10 is provided by the fuel cell 110 only, and no power is provided to the aircraft 10 from the secondary battery 120. When the first output end voltage Va of the fuel cell 110 rises to the input voltage set value $V_{S2}$, this indicates that the fuel cell 110 charges the secondary battery 120 only when the power requirement of the aircraft 10 (the load) decreases. When the first output end voltage Va of the fuel cell 110 drops to the output voltage set value $V_{S1}$, this indicates that the secondary battery 120 provides power to the aircraft 10 to replenish the power deficiency of the fuel cell 110 only when the power supply of the fuel cell 110 is less than the power requirement of the aircraft 10.

Figure 4A:
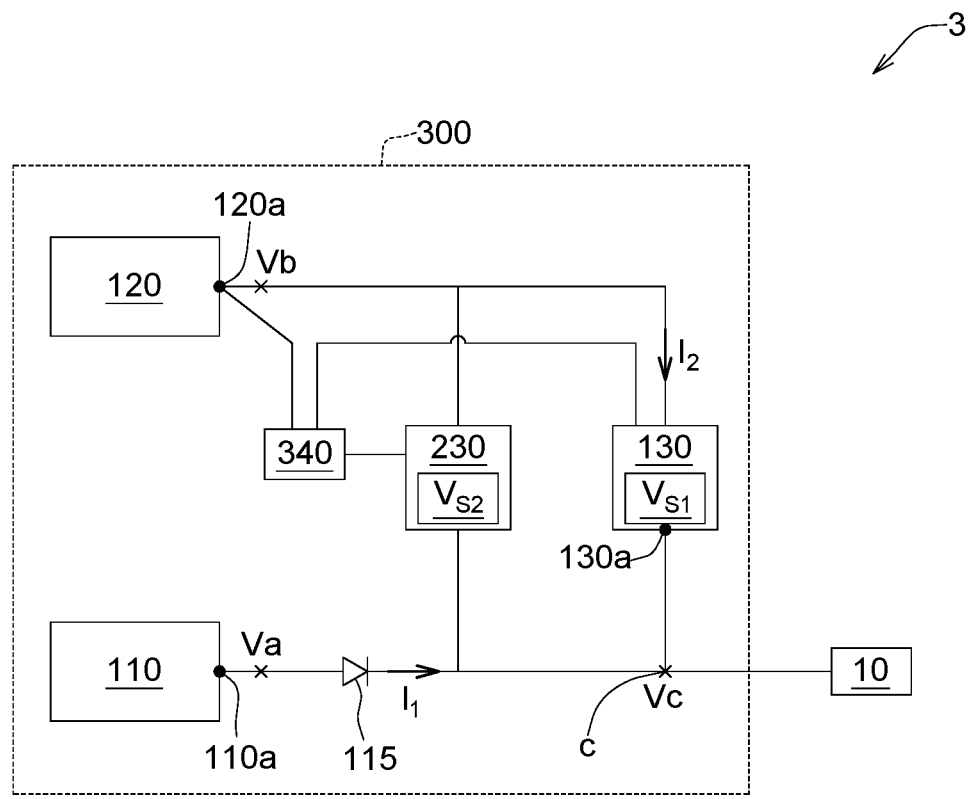
FIG. 4A is a schematic diagram of a flying tool according to another embodiment of the present disclosure.
Figure 4B:
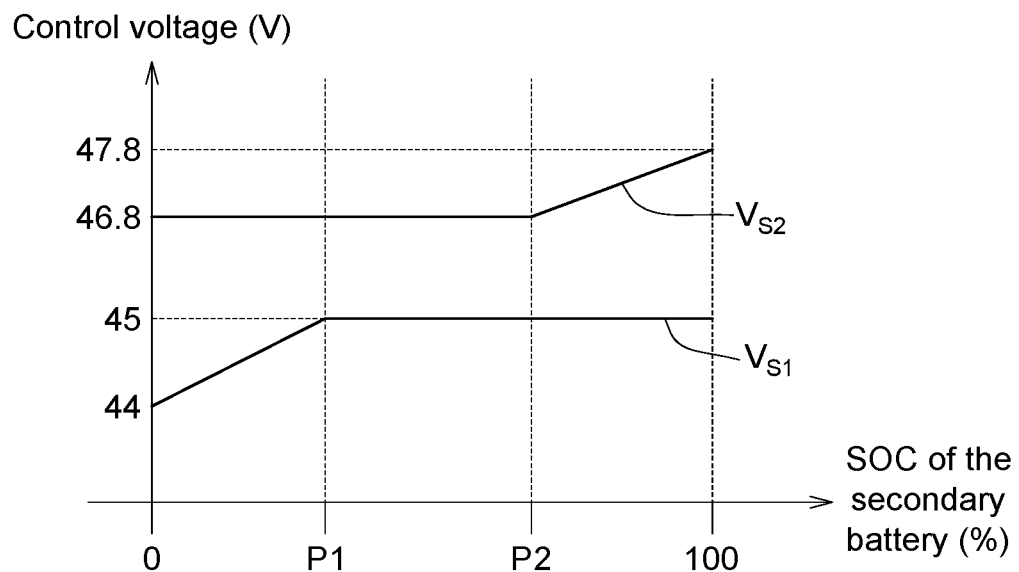
FIG. 4B is a schematic diagram of the setting mode of the output voltage set value of the first transformer and the input voltage set value of the second transformer of FIG. 4A.

Refer to FIGS. 4A and 4B. FIG. 4A is a schematic diagram of a flying tool 3 according to another embodiment of the present disclosure. FIG. 4B is a schematic diagram of the setting mode of the output voltage set value $V_{S1}$ of the first transformer 130 and the input voltage set value $V_{S2}$ of the second transformer 230 of FIG. 4A. The flying tool 3 includes a power supply device 300 and an aircraft 10. The power supply device 300 is disposed on the aircraft 10 to provide a power to the aircraft 10.

As indicated in FIG. 4A, the power supply device 300 includes a fuel cell 110, a diode 115, a secondary battery 120, a first transformer 130, a second transformer 230 and a controller 340. The first transformer 130 is coupled between the aircraft 10 and the output end 120a of the secondary battery 120. The second transformer 230 is coupled between the output end 110a of the fuel cell 110 and the output end 120a of the secondary battery 120. The aircraft 10 is coupled to the output end 110a of the fuel cell 110 and the output end 130a of the first transformer 130 to receive power supply from the fuel cell 110 and the first transformer 130. The controller 340 is electrically coupled to the secondary battery 120, the first transformer 130 and the second transformer 230. In the preset embodiment, the controller 340 changes the output voltage set value $V_{S1}$ and the input voltage set value $V_{S2}$ according to the SOC of the secondary battery 120.

As indicated in FIG. 4B, the second pre-set capacity P2 is higher than the first pre-set capacity P1. When the SOC of the secondary battery 120 is lower than the first pre-set capacity P1, this indicates that the secondary battery 120 is has a low SOC. To reduce the power consumption occurrence rate of the secondary battery, the controller 340 decreases the output voltage set value $V_{S1}$ to reduce the chance at which the secondary battery 120 provides power to the aircraft 10. That is, the probability or time period of the secondary battery 120 providing power to the aircraft 10 is reduced, and the lifespan of the secondary battery 120 is prolonged. Moreover, the controller 340 can decrease the output voltage set value $V_{S1}$ to increase the chance at which the fuel cell 110 provides power to the aircraft 10. That is, the probability or time period of the fuel cell 110 providing power to the aircraft 10 increases and causes the fuel cell 110 to output more power to the aircraft 10 to make up the reduced amount of power supply provided to the aircraft 10 by the secondary battery 120. When the SOC of the secondary battery 120 is higher than the second pre-set capacity P2, this indicates that the secondary battery 120 has a sufficient or high SOC. Therefore, the controller 340 can increase the input voltage set value $V_{S2}$ and reduce the chance at which the fuel cell 110 charges the secondary battery 120, that is, the probability or time period of the fuel cell 110 charging the secondary battery 120 is reduced, and the probability or time period of the fuel cell 110 operating with higher efficiency (high output voltage) at a range is increased.

In an embodiment, when the SOC of the secondary battery 120 is equivalent to the second pre-set capacity P2, the input voltage set value $V_{S2}$ can be 46.8V; when the SOC of the secondary battery 120 is 100%, the input voltage set value $V_{S2}$ can be 47.8V; the change between 46.8V and 47.8V can be linear. Furthermore, the SOC of the secondary battery 120 ranges between 0% and the second pre-set capacity P2, and the input voltage set value $V_{S2}$ can remain as a constant.

In an embodiment, when the SOC of the secondary battery 120 is equivalent to the first pre-set capacity P1, the output voltage set value $V_{S1}$ can be 45V; when the SOC of the secondary battery 120 is 0%, the output voltage set value $V_{S1}$ can be 44V; the change between 45V and 44V can be linear. Moreover, the SOC of the secondary battery 120 ranges between the first pre-set capacity P1 and 100%, the output voltage set value $V_{S1}$ can remain as a constant.

Figure 4C:
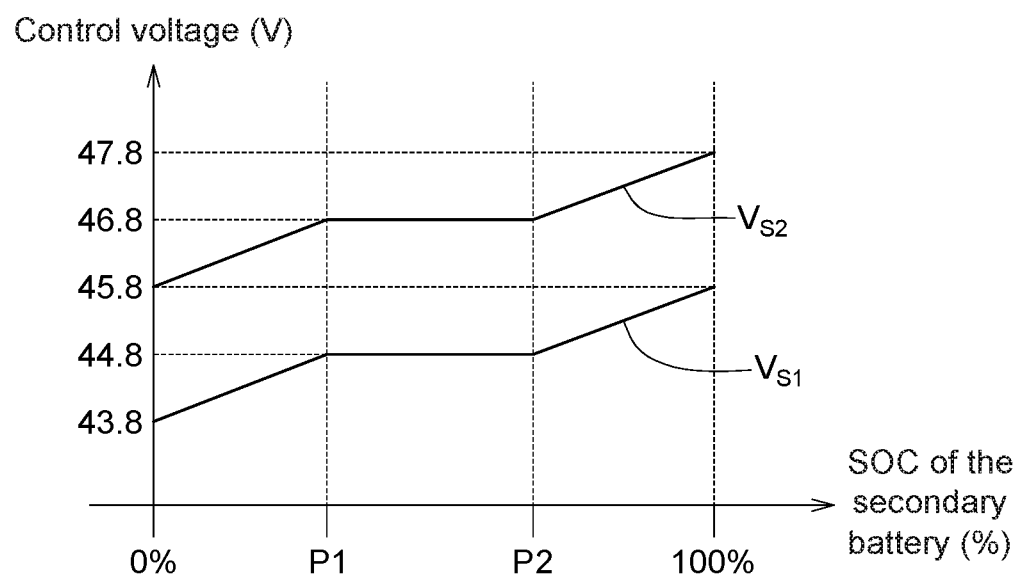
FIG. 4C is another schematic diagram of the setting mode of the output voltage set value of the first transformer and the input voltage set value of the second transformer of FIG. 4A.

Referring to FIG. 4C, another schematic diagram of the setting mode of the output voltage set value $V_{S1}$ of the first transformer 130 and the input voltage set value $V_{S2}$ of the second transformer 230 of FIG. 4A is shown. It should be noted that in the setting mode of FIG. 4C, the SOC of the secondary battery 120 ranges between the second pre-set capacity P2 and 100%, and the output voltage set value $V_{S1}$ rises as the SOC increases. In other words, when the SOC of the secondary battery 120 is substantially equivalent to or higher than the second pre-set capacity P2, the SOC of the secondary battery 120 is sufficient, and the first transformer 130 can increase the chance at which the secondary battery 120 provides power to the aircraft 10. That is, the probability or time period of the secondary battery 120 providing power to the aircraft 10 is increased. Moreover, since the higher the SOC of the secondary battery 120, the larger the output voltage set value $V_{S1}$, and the chance of the secondary battery 120 providing power to the aircraft 10 increases as the SOC of the secondary battery 120 increases.

It should be noted that in the setting mode of FIG. 4C, when the SOC of the secondary battery 120 ranges between 0% and the first pre-set capacity P1, the input voltage set value $V_{S2}$ drops as the SOC decreases. In other words, when the SOC of the secondary battery 120 is substantially equivalent to or lower than the first pre-set capacity P1, this indicates that the secondary battery 120 is has a low SOC. Therefore, the controller 340 can decrease the input voltage set value $V_{S2}$ and increase the chance at which the fuel cell 110 charges the secondary battery 120. That is, the probability or time of the fuel cell 110 charging the secondary battery 120 is increased. Moreover, since the lower the SOC of the secondary battery 120, the smaller the input voltage set value $V_{S2}$, and the chance of the fuel cell 110 charging the secondary battery 120 increases as the SOC of the secondary battery 120 decreases.

In an embodiment, the first pre-set capacity P1 can be 30%, and the second pre-set capacity P2 can be 70%, but the present disclosure is not limited thereto. Due to the features of the secondary battery 120, the lifespan of the secondary battery 120 will be reduced when the SOC of the secondary battery 120 is too high or too low. Since the SOC of the secondary battery 120 can be controlled to a suitable range (such as between the first pre-set capacity P1 and the second pre-set capacity P2) according to the above arrangement of the present disclosure, the lifespan of the secondary battery 120 can be prolonged.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply device disposed on an aircraft to provide a power to the aircraft, wherein the aircraft has an average required power value, and the power supply device comprises:
   a secondary battery;
   a first transformer coupled between the secondary battery and the aircraft; and
   a fuel cell coupled to the aircraft and adapted to provide a first output current to the aircraft;
   wherein the first transformer has an output voltage set value, and provides a second output current of the secondary battery to the aircraft when a first output end voltage of the fuel cell is lower than the output voltage set value; wherein the output voltage set value is in a voltage range with a fuel cell output power between the maximum power value of a characteristic curve of the fuel cell and the average required power value of the aircraft;
   wherein the power supply device further comprises a switch coupled between an output end of the secondary battery and an output end of the fuel cell, and the switch is connected and causes the fuel cell to charge the secondary battery when the first output end voltage is equivalent to or higher than a second output end voltage at the output end of the secondary battery.

2. The power supply device according to claim 1, wherein when the aircraft is in a start-up stage, the fuel cell does not provide current to the aircraft but the secondary battery provides the second output current to the aircraft.

3. The power supply device according to claim 1, wherein when the first output end voltage provided by the fuel cell is not lower than the output voltage set value, the secondary battery does not provide a current to the aircraft.

4. The power supply device according to claim 1, wherein when the first output end voltage at the output end of the fuel cell is higher than the second output end voltage at the output end of the secondary battery, the fuel cell charges the secondary battery.

5. The power supply device according to claim 1, wherein when a SOC of the secondary battery reaches a pre-set capacity, the switch is disconnected and causes the fuel cell to stop charging the secondary battery.

6. The power supply device according to claim 1, wherein when the first output end voltage of the fuel cell is equivalent to or lower than the output voltage set value, the secondary battery provides the second output current, and the fuel cell provides the first output current to the aircraft.

7. A power supply device disposed on an aircraft to provide a power to the aircraft, wherein the aircraft has an average required power value, and the power supply device comprises:
   a secondary battery;
   a first transformer coupled between the secondary battery and the aircraft; and
   a fuel cell coupled to the aircraft and adapted to provide a first output current to the aircraft;
   wherein the first transformer has an output voltage set value, and provides a second output current of the secondary battery to the aircraft when a first output end voltage of the fuel cell is lower than the output voltage set value;
   wherein the output voltage set value is in a voltage range with a fuel cell output power between the maximum power value of a characteristic curve of the fuel cell and the average required power value of the aircraft;
   wherein the power supply device further comprises:
   a second transformer coupled between the fuel cell and the secondary battery, wherein the second transformer has an input voltage set value higher than the output voltage set value of the first transformer;
   wherein when the first output end voltage of the fuel cell is equivalent to or higher than the input voltage set value, the fuel cell charges the secondary battery.

8. The power supply device according to claim 7, wherein when a SOC of the secondary battery is lower than a first pre-set capacity, the output voltage set value of the first transformer decreases; when the SOC of the secondary battery is higher than a second pre-set capacity, the input voltage set value of the second transformer increases; the second pre-set capacity is higher than the first pre-set capacity.

9. A flying tool, comprising: an aircraft having an average required power value; and
   a power supply device disposed on the aircraft to provide a power to the aircraft and comprising:
   a secondary battery;
   a first transformer coupled between the secondary battery and the aircraft; and
   a fuel cell coupled to the aircraft and adapted to provide a first output current to the aircraft;
   wherein the first transformer has an output voltage set value, and provides a second output current of the secondary battery to the aircraft when a first output end voltage of the fuel cell is lower than the output voltage set value;
   wherein the output voltage set value is in a voltage range with a fuel cell output power between the maximum power value of a characteristic curve of the fuel cell and the average required power value of the aircraft;
   wherein the power supply device further comprises a switch coupled between an output end of the secondary battery and an output end of the fuel cell, and the switch is connected and causes the fuel cell to charge the secondary battery when the first output end voltage is equivalent to or higher than a second output end voltage at the output end of the secondary battery.

10. A power supply method of a power supply device, wherein the power supply device is disposed on an aircraft and comprises a secondary battery, a first transformer and a fuel cell; the secondary battery is coupled to the aircraft through the first transformer having an output voltage set value; the power supply method comprises:
    providing a first output current to the aircraft by the fuel cell; and
    providing a second output current of the secondary battery to the aircraft by the first transformer when a first output end voltage of the fuel cell is lower than the output voltage set value;
    wherein the output voltage set value is in a voltage range with a fuel cell output power between the maximum power value of a characteristic curve of the fuel cell and the average required power value of the aircraft;
    wherein the power supply device further comprises a switch coupled between an output end of the secondary battery and an output end of the fuel cell, and the power supply method further comprises:
    connecting the switch and causing the fuel cell to charge the secondary battery when the first output end voltage is equivalent to or higher than a second output end voltage at the output end of the secondary battery.

11. The power supply method according to claim 10, further comprising:
    not providing current to the aircraft by the secondary battery when the first output end voltage provided by the fuel cell is not lower than the output voltage set value.

12. The power supply method according to claim 10, further comprising:
    charging the secondary battery by the fuel cell when the first output end voltage at the output end of the fuel cell is higher than the second output end voltage at the output end of the secondary battery.

13. The power supply method according to claim 10, further comprising:
    disconnecting the switch and causing the fuel cell to stop charging the secondary battery when a SOC of the secondary battery reaches a pre-set capacity.

14. The power supply method according to claim 10, further comprising:
    providing the second output current by the secondary battery when the first output end voltage of the fuel cell is equivalent to or lower than the output voltage set value and concurrently providing the first output current to the aircraft by the fuel cell.

15. A power supply method of a power supply device, wherein the power supply device is disposed on an aircraft and comprises a secondary battery, a first transformer and a fuel cell; the secondary battery is coupled to the aircraft through the first transformer having an output voltage set value; the power supply method comprises:
- providing a first output current to the aircraft by the fuel cell; and
- providing a second output current of the secondary battery to the aircraft by the first transformer when a first output end voltage of the fuel cell is lower than the output voltage set value;
- wherein the output voltage set value is in a voltage range with a fuel cell output power between the maximum power value of a characteristic curve of the fuel cell and the average required power value of the aircraft;
- wherein the power supply device further comprises a second transformer having an input voltage set value higher than the output voltage set value of the first transformer; the power supply method further comprising:
- charging the secondary battery by the fuel cell when the first output end voltage of the fuel cell is equivalent to or higher than the input voltage set value.

16. The power supply method according to claim 15, further comprising:
- decreasing the output voltage set value of the first transformer when a SOC of the secondary battery is lower than a first pre-set capacity;
- increasing the input voltage set value of the second transformer when the SOC of the secondary battery is higher than a second pre-set capacity;
- wherein the second pre-set capacity is higher than the first pre-set capacity.

* * * * *